United States Patent [19]

Baumard et al.

[11] Patent Number: 5,308,809
[45] Date of Patent: May 3, 1994

[54] TRANSPARENT CERAMICS AND PRODUCTION PROCESS FOR THE SAME

[75] Inventors: Jean-François Baumard, Limoges; Marcel Boncoeur, Paris; Gilles Gasgnier, Limoges; Louis Minjolle, Tarbes, all of France

[73] Assignee: Commissariat A L' Energie Atomique, France

[21] Appl. No.: 893,209

[22] Filed: Jun. 2, 1992

[30] Foreign Application Priority Data

Jun. 5, 1991 [FR] France .................. 91 06784

[51] Int. Cl.⁵ .................................. C04B 35/50
[52] U.S. Cl. ............................... 501/152; 264/65; 264/66
[58] Field of Search .............. 501/152; 264/65, 66

[56] References Cited

U.S. PATENT DOCUMENTS

| | | | |
|---|---|---|---|
| 4,040,845 | 8/1977 | Richerson et al. | 106/38.9 |
| 4,098,612 | 7/1978 | Rhodes et al. | 501/152 |
| 4,166,831 | 7/1979 | Rhodes et al. | 501/152 |

FOREIGN PATENT DOCUMENTS

| | | |
|---|---|---|
| 0370824 | 5/1990 | European Pat. Off. . |
| 0385510 | 9/1990 | European Pat. Off. . |
| 0419847 | 4/1991 | European Pat. Off. . |
| 0456541 | 11/1991 | European Pat. Off. . |
| 1178495 | 1/1970 | United Kingdom . |
| 2163970 | 3/1986 | United Kingdom . |

*Primary Examiner*—Mark L. Bell
*Assistant Examiner*—Deborah Jones
*Attorney, Agent, or Firm*—Pearne, Gordon, McCoy & Granger

[57] ABSTRACT

The present invention relates to a ceramic based on yttrium oxide and titanium oxide. This ceramic has a light transmission percentage of at least 20% in a wavelength range between 0.5 and 8 μm.

It also relates to a sintering process for obtaining said ceramic.

15 Claims, 2 Drawing Sheets

TRANSPARENT CERAMICS AND PRODUCTION PROCESS FOR THE SAME

The present invention relates to a light transparent ceramic and to a process for the production thereof. It more particularly relates to a ceramic based on yttrium oxide and titanium oxide.

The use of yttrium oxide alone as the powder for ceramics does not make it possible to obtain a satisfactory ceramic, because the granular growth takes place too rapidly during densification. It is then necessary to sinter the material at a very high temperature, which generally exceeds 1700° C. Without the assistance of an external pressure, e.g. supplied by sintering under load or by hot isostatic compaction, the density remains limited by the intragranular porosity to approximately 99% of the theoretical density. This residual porosity and the size of the grains are prejudicial to the mechanical and optical properties.

The problem is to speed up the densification process compared with the granular growth process. It would thus be possible to obtain ceramics having high densities at lower temperatures, final densities closer to the theoretical density and an improved microstructure.

A solution to this problem has been proposed and described in French patent application 90 05888, which consists of using a composition based on yttrium oxide and incorporating at least one titanium oxide or precursors of said oxides, whereby said composition can be sintered at a temperature below 1700° C. The ceramic obtained has a density representing at least 90% of the theoretical density and preferably a density between 95 and 100% of the theoretical density. However, said ceramic is only slightly transparent to photons or light rays.

One of the aims of the present invention is to obviate this disadvantage by proposing a ceramic based on yttrium oxide which is transparent to light rays, i.e. having a high light ray transmission power in a wide wavelength range.

To this end, the invention proposes a ceramic based on yttrium oxide and titanium oxide, which is characterized in that it has a transmission power, expressed as a light transmission percentage, of at least 20% for wavelengths between 0.5 and 8 $\mu$m.

The optical transmission power is measured by spectrometers for wavelengths between 0.2 and 10 $\mu$m, the equipment being adapted to given wavelength ranges.

According to the invention, the ceramic contains 0.01 to 2% by weight titanium oxide and preferably 0.1 to 0.5% by weight, based on the ceramic weight.

According to another feature of the invention, the inventive ceramic has a high densification level. Thus, the density of the ceramic is at least 9?.6% of the theoretical density.

The ceramic according to the invention advantageously has a light transmission power of at least 70% for wavelengths between 2.5 and 7 $\mu$m.

Thus, the ceramics according to the invention can be used for producing infrared optical windows for lasers or envelopes for tungsten halogen lamps.

The invention also relates to a process for the production of a transparent ceramic of the type described hereinbefore. The inventive process consists of preparing a precursor composition of a ceramic, which is to be sintered in order to provide a ceramic in accordance with the invention.

Such a composition is in particular obtained by producing an intimate mixture of an yttrium oxide and at least one titanium oxide, as described in French patent application 90 05888. This mixture can also be obtained from precursors of said oxides.

The term precursor of yttrium oxide and titanium oxide is understood to mean any yttrium or titanium compound (mineral or organic salts, hydroxides, etc.), which can lead to an oxide phase under the sintered ceramic substance production conditions.

The term titanium oxide stands for titanium dioxide $TiO_2$ and/or a mixed Ti-Y oxide such as $Y_2TiO_5$ and/or $Y_2Ti_2O_7$.

The proportion of titanium ions expressed as $TiO_2$ and yttrium ions expressed as $Y_2O_3$ can vary within wide limits. However, it is appropriate to have 0.01 to 2% by weight $TiO_2$ and 98 to 99.99% by weight $Y_2O_3$.

A preferred composition is 0.1 to 0.5% by weight $TiO_2$ and 99.5 to 99.9% by weight $Y_2O_3$.

The composition is intended to form a sintered ceramic material. It can have several forms essentially linked with the preparation procedure which will be described hereinafter.

This composition can be all oxide, i.e. containing yttrium oxide and titanium oxide in the form of a single oxide, optionally a mixed oxide $Y_2TiO_5$, $Y_2Ti_2O_7$. It can be in the form of a mixture of yttrium oxide and a titanium oxide precursor.

It is also possible for the yttrium and titanium to both be in precursor form when a coprecipitate is used.

In all cases the oxide precursor is transformed into its corresponding oxide either during any desired prior calcination stage, or during the sintering of the composition in order to obtain the sintered ceramic material.

The composition for ceramics can be prepared in different ways.

A first variant consists of a "chamotting" method. The yttrium oxide is intimately mixed with at least one titanium oxide, optionally following drying. The yttrium oxide used in the invention is a known product which is described in the literature.

It can in particular be prepared by heating in air at between 400° and 1000° C. yttrium hydroxide or certain oxygen-containing salts such as nitrates, sulphates, carbonates, oxalates and acetates (cf. Paul PASCAL—Nouveau Traité de Chimie Minérale, vol. VII).

It is preferable that the yttrium oxide used has a high purity level, which preferably exceeds 99.9%.

The titanium oxide can be titanium monoxide, titanium sesquioxide, titanium dioxide in anatase or rutile form.

It is also possible to supply the titanium ions in the form of a mixed yttrium and titanium oxide and in particular $Y_2TiO_5$ and $Y_2Ti_2O_7$. The latter are e.g. obtained by chamotting a mixture of titanium and yttrium oxides in appropriate proportions and at approximately 1300° C. It is also possible to use a mixture of the aforementioned oxides. The proportion of the different oxides used is such that the aforementioned weight percentages are obtained.

The various oxide powders are, if necessary, deagglomerated so as not to have hard agglomerates. It is desirable for them to have a grain size such that their average diameter is slightly less or approximately 1 $\mu$m. Grain size analysis takes place with the aid of the SEDIGRAPH 5000 D instrument, which measures the distribution of the suspended particles. The average diameter is a diameter such that 50% by weight of the particles have a larger or smaller diameter than the average diameter.

In order to bring the powders to the desired grain size, most frequently a grinding or milling takes place and this can be performed by a wet or dry procedure.

It is possible to use air jet grinding, but usually grinding takes place in a conventional dry manner or in suspension in the presence or absence of conventional additives for such procedures, e.g. grinding agents and dispersants.

In a preferred manner, the oxide powders are ground suspended in water or an organic liquid such as alcohols, e.g. methanol, ethanol, n-propanol, isopropanol or aldehydes or ketones, such as e.g. benzaldehyde and optionally in the presence of a dispersing agent such as e.g. sodium hexametaphosphate, sodium silicate, triethanol amine, ammonium polyacrylates, glycols such as propylene glycol, diethylene glycol, triethylene glycol, etc.

At the end of the said grinding operation a mixture is obtained which can contain 40 to 80% water or organic liquid. It is then desirable to eliminate it by drying. Drying takes place at a temperature which depends on the liquid to be eliminated and which is usually between 20° and 400° C., but preferably between 20° and 150° C. This operation can take place in air or under a reduced pressure, e.g. at between 1 and 100 mm of mercury (133.3322 and 13332.2 Pa).

It can in particular be carried out by the atomization procedure, i.e. by spraying in a hot air flow, whose temperature is within the aforementioned range.

The drying period is dependent on the liquid quantity to be eliminated and the procedure used. It can therefore vary within wide limits, e.g. between 15 minutes and 48 hours.

A second way to obtain the composition consists of preparing it according to a coprecipitation process consisting of
a) performing a coprecipitation of an yttrium compound and titanium from a solution of soluble salts of the aforementioned elements,
b) separating the coprecipitate obtained.

In the first stage of the process the yttrium and titanium and coprecipitated.

The solutions of soluble starting salts can be aqueous or organic solutions of mineral or organometallic compounds.

The organic solvent is water-miscible and is preferably an aliphatic alcohol having 1 to 4 carbon atoms or a glycol such as e.g. ethylene glycol or diethylene glycol.

The solutions of soluble yttrium salts used initially are preferably solutions of yttrrium sulphate, chloride and/or nitrate.

The yttrium salt is chosen in such a way that it does not contain impurities which can be encountered in the calcined product. It may be advantageous to use an yttrium salt with a degree of purity in excess of 99.9%.

The yttrium salt concentration in the solution is not a critical factor according to the invention and can vary within wide limits. A concentration between 0.2 and 4 moles per liter is preferred.

With regards to the titanium salts a non-limitative list of compounds which can be used consists of titanium chloride, titanium oxychloride, a titanium alkoxide derived from an aliphatic alcohol having 1 to 4 carbon atoms, such as e.g. tetramethylate, tetraethylate, n-tetrapropylate, tetraisopropylate, n-tetrabutylate, titanium tetraisobutylate. The titanium salt is preferably chosen so as to have a high purity in the same way as the yttrium salt.

The titanium salt concentration in the solution is not critical and preferably varies between 0.002 and 0.04 mole per liter.

Mixing of the aforementioned compounds takes place in a random order and the proportions are such that the aforementioned weight percentages are obtained.

Yttrium and titanium compounds which can be precipitated are hydroxides, oxylates and carbonates. Coprecipitation of the hydroxides can be carried out by mixing a solution of soluble salts with a basic solution.

The basic solution used can in particular be an aqueous solution of ammonia, or sodium hydroxide, or potash. Preferably an ammonia solution is used. The normality of the basic solution used is not a critical factor according to the invention and can vary within wide limits. However, it is advantageously between 1 and 5N and preferably 2 and 3N.

The proportion between the basic solution and the solution of soluble salts of yttrium and titanium must be such that the number of basic equivalents is equal to or greater than the number of yttrium and titanium equivalents. The pH of the reaction medium is not critical and can vary between 7 and approximately 14, advantageously being between 9 and 12.

The temperature of the reaction medium is generally preferably between 10° and 95° C. A mixed coprecipitate of yttrium and titanium hydroxides is obtained.

Another precipitation procedure can be oxalic coprecipitation. The solutions of yttrium and titanium salts comply with the aforementioned characteristics.

The precipitating agent can be oxalic acid or its preferably ammonium salts in anhydrous or hydrated form. It can be brought into crystalline form or the form of an aqueous solution. In this case, the concentration expressed as oxalic acid can vary between 0.8 and 3 and preferably between 0.3 and 1 mole/liter.

The proportion between the oxalic solution and the solution of soluble yttrium and titanium salts is such that the number of oxalic equivalents is equal to or greater than the number of yttrium and titanium equivalents. It is possible to use an excess representing up to 50% of stoichiometry.

Coprecipitation is performed at a temperature between 10° and 95° C. and at a pH between 5.5 and 6. A coprecipitate of titanium and yttrium oxalates is obtained.

The second stage of the process consists of separating the coprecipitate from the suspension obtained. This separation can take plane in accordance with conventional liquid/solid saparation procedures such as decanting, suction filtering, filtering and/or centrifuging.

According to a variant of the process, the separated coprecipitate can then be washed with water.

The product obtained after separation and optionally washing can then be dried under the aforementioned conditions. The drying temperature is preferably between 20° and 150° C. The drying time preferably varies between 15 minutes and 48 hours.

The dry product can then be calcined in order to decompose the precipitated salts into oxide. Calcination generally takes place at between 400° and 600° C. Calcination can last between 30 minutes and 24 hours in an exemplified manner and is preferably between 1 and 13 hours. The duration of the calcination is correlated with the temperature and the higher the calcination temperature the shorter it is.

Another variant consists of using the impregnation of the yttrium oxide by means of a solution of at least one titanium salt decomposable into oxide by heating and which in simplified manner is referred to as an oxide precursor. As oxide precursors it is possible to use the aforementioned soluble salts brought into an aqueous or organic solution in the manner described hereinbefore. The concentration of the solution of the oxide precursor is dependent on the solubility thereof.

In practical terms, impregnation can be carried out by introducing a soluble titanium salt during the deagglomeration of the yttrium oxide in an alcoholic medium, e.g. by introducing an organometallic compound of titanium, such as e.g. tetrabutylate or tetraisobutylate and by hydrolyzing said organometallic compound by adding water. The suspended oxide powders are then dried, as in the case of the chamotting procedure. Drying and calcining can be carried out under the conditions given hereinbefore.

Advantageously, the above-described compositions are shaped by conventional processes such as uniaxial pressing, isostatic pressing, moulding, compacting, extrusion or injection prior to being sintered.

The sintering of these compositions consists of a heat treatment carried out by raising the temperature of the part formed at between 1300° and 1800° C., advantageously between 1500° and 1700° C. The part is then kept at this temperature, generally referred to as the sintering temperature, for a given variable time dependent on the composition, density and microstructure which are desired. During the temperature rise, the part shrinks as a result of the densification of the material and the linear shrinkage is approximately 15 to 20%.

According to the invention, the part to be sintered is kept in an atmosphere containing oxygen for at least part of the heat treatment, namely at least from the time where the shrinkage percentage represents 75% of the total shrinkage observed on the part and this applies at least up to the end of the shrinkage phenomenon.

Thus, carrying out sintering in the presence of oxygen makes it possible to obtain a ceramic having a very high density and in particular exceeding 99.6% of the theoretical density. The ceramic obtained has the property of being transparent to light.

The term atmosphere containing oxygen is understood to mean any atmosphere containing at least 99% by volume oxygen and preference is given to the use of pure oxygen. For reasons of clarity, oxygen is used to define any atmosphere containing oxygen.

According to another feature of the invention, the sintering can be entirely performed under oxygen.

According to an embodiment of the invention, the part is maintained under an isostatic pressure for the duration of the sintering. According to another embodiment it undergoes a hot treatment under a high isostatic pressure following the sintering stage. This treatment consists of applying a high isostatic pressure to a part raised to a high temperature, i.e. in a range where the material becomes plastic. This process is referred to as hot isostatic pressing (HIP).

Thus, the pressures used for treating the parts according to the invention are between $1000 \times 10^5$ Pa and $3000 \times 10^5$ Pa and the temperature is between approximately 1000° and 1700° C.

According to the invention, the ceramics which have undergone hot isostatic pressing are advantageously subjected to a subsequent heat treatment or annealing carried out under an oxidizing atmosphere at a temperature higher than 1000° C. and below the sintering temperature, preferably between 1000° and 1500° C. and advantageously between 1100° and 1300° C. This heat treatment makes it possible to reestablish the oxygen stoichiometry in the material.

The process according to the invention makes it possible to obtain a ceramic based on yttrium oxide having a transparency of the same order of magnitude as that of pure yttrium oxide, but obtained according to a simpler and more economic process, in particular with a gain of several hundred degrees with regards to the sintering temperature and which is performed in an oxidizing atmosphere.

BRIEF DESCRIPTION OF DRAWINGS

Other aims, details and advantages of the invention can be more clearly gathered from the following non-limitative examples and with reference to the attached drawings, wherein show.

In the examples, the concentrations are given as weight percentages of oxides, unless the contrary is indicated.

EXAMPLES 1 TO 4

A composition is prepared, which contains yttrium oxide and titanium oxide using an impregnation method.

Mixing takes place of 50 g of previously ground and dried yttrium oxide and 50 cm$^3$ of ethanol. This is followed by the addition of 0.425 g of titanium n-tetrabutylate, which corresponds to 0.2% $TiO_2$. This is followed by a grinding operation using a zircon ball mill (ATTRITOR) rotating at 200 r.p.m. for 15 minutes. This is followed by the addition of 10 cm$^3$ of distilled water and the grinding operation is continued for 105 minutes. The ethanol and water are eliminated by evaporating in an evaporator under reduced pressure provided by the water-jet pump.

A composition in the form of a powder is obtained, which is screened at 100 $\mu m$. The composition is pelletized under a pressure of 150 MPa and then sintered.

Sintering takes place in a tube furnace with heating in accordance with the following cycle:
temperature rise: 10° C./min up to 1000° C.
temperature rise: 1.5° C./min up to the sintering temperature
maintaining at 1600° C. (sintering temperature) for 3 hours
free cooling.

Oxygen is introduced into the tube as from the start of the heat cycle and scavenging is eliminated during cooling.

Figure 1:
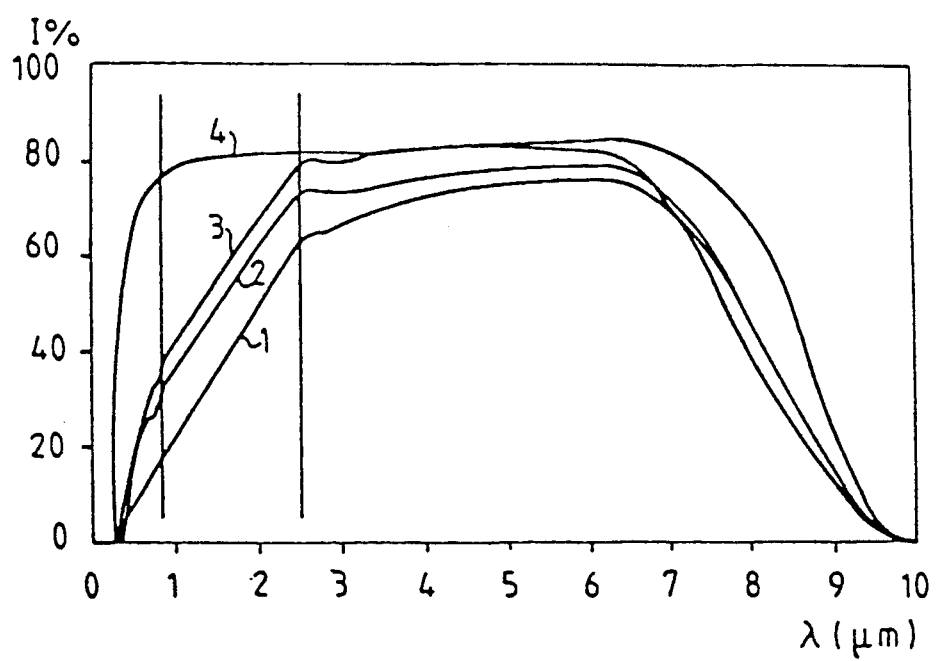
FIG. 1: A graph showing the variation of the transmitted light intensity (I%) as a function of the wavelength $\lambda$ in $\mu m$ for different ceramics according to the invention.

The transparency properties of this ceramic are illustrated by curve 1 in FIG. 1.

Part of the material obtained then undergoes a HIP treatment consisting of placing the material in an enclosure, introducing an argon pressure of $850 \times 10^5$ Pa into the enclosure and heating the latter with a temperature rise speed of 1200° C./h. The temperature is maintained at 1700° C. for 1 hour and the pressure is then 1700·10$^5$ Pa.

Cooling then takes place at a rate of 1200° C./h with the suppression of the argon pressure at the end of cooling.

The properties of said ceramic are illustrated by curve 2 in FIG. 1.

Finally, the ceramic obtained following the HIP treatment undergoes a subsequent heat treatment consisting of maintaining said ceramic for 2 hours at 1200° C. in air.

The transparency properties of the product obtained are illustrated by curve 3 in FIG. 1.

For comparison, FIG. 1 also reveals curve 4 illustrating the transparency properties of a Y$_2$O$_3$ monocrystal.

Thus, these results clearly show that the ceramics according to the invention have a degree of transparency of the same order of magnitude and in fact equivalent to that of the yttrium oxide monocrystal.

EXAMPLE 5 TO 7

Examples 1 to 4 are repeated, but with variable titanium oxide concentrations given in table I.

| EXAMPLE | % TiO$_2$ | CURVE |
| --- | --- | --- |
| 5 | 0.05% | 5 |
| 6 | 0.2% | 7 |
| 7 | 0.5% | 16 |

Figure 2:
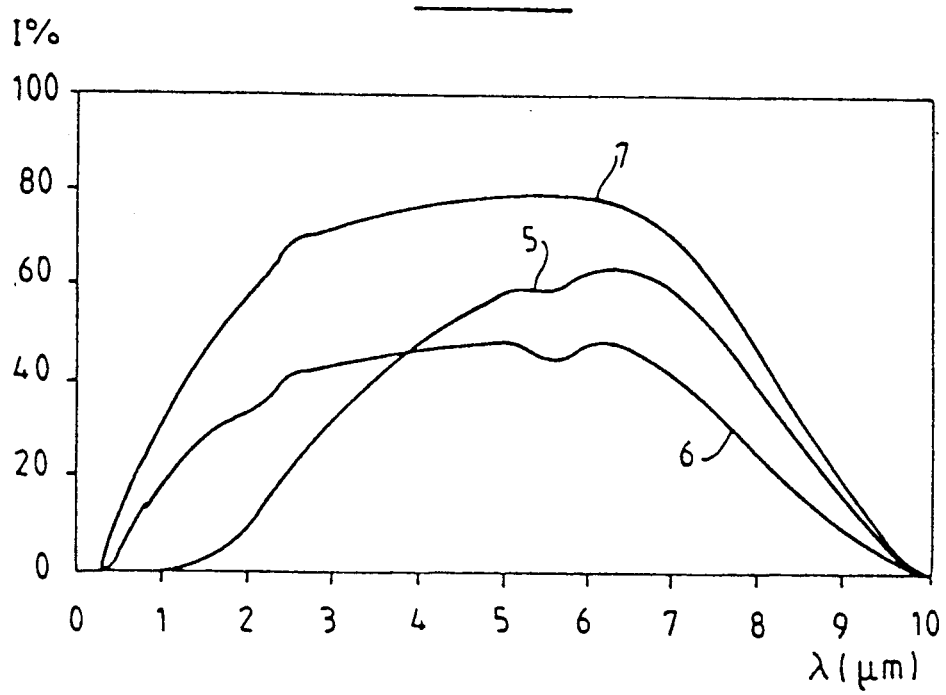
FIG. 2: A graph similar to that of FIG. 1 having variation curves for the light intensity transmitted by ceramics according to the invention with variable $TiO_2$ contents.
Figure 3:
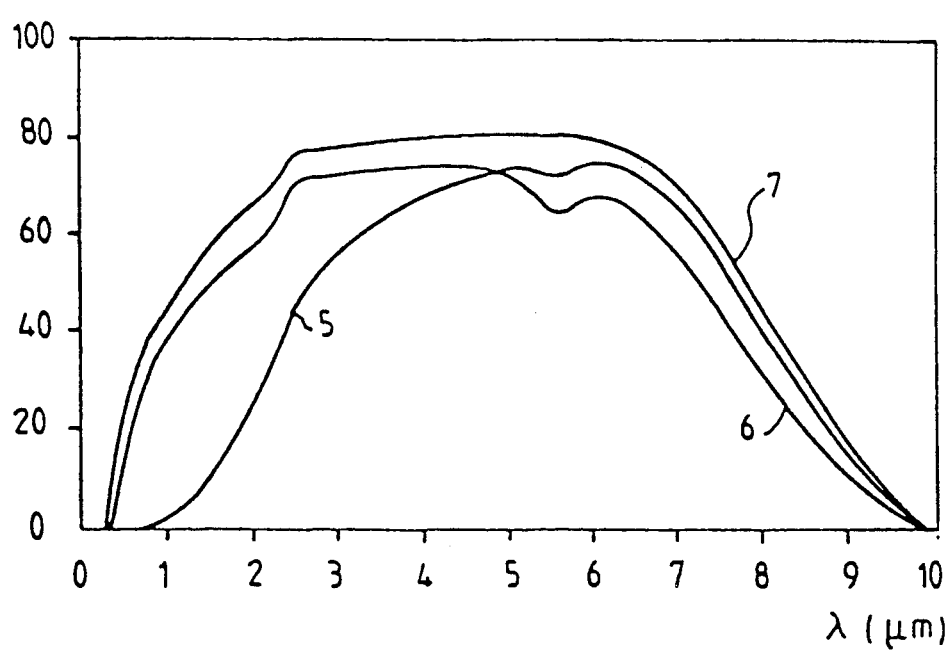
FIG. 3: The variation of the light intensity transmitted by the ceramics illustrated in FIG. 2, but which have undergone hot isostatic pressing and annealing in air.

FIG. 2 illustrates the results obtained following sintering at 600° C. under oxygen. FIG. 3 shows the intensity transmitted by these ceramics following hot isostatic pressing and annealing under an oxidizing atmosphere.

We claim:

1. A ceramic consisting essentially of yttrium oxide and from about 0.01 to 2% by weight of titanium oxide, having a light transmission percentage of at least 20% in the wavelength range between 0.5 and 8 μm.

2. The ceramic according to claim 1, having density of at least 99.6% of the theoretical density.

3. The ceramic according to claim 1, having light transmission of at least 70% in the wavelength range between 2.5 and 7 μm.

4. The ceramic according to claim 1, having the titanium oxide weight concentration is between 0.1 and 0.5% by weight.

5. A process for producing a ceramic consisting essentially of yttrium oxide and from about 0.01 to 2% by weight of titanium oxide, having a light transmission percentage of at least 20% in the wavelength range between 0.5 and 8 μm, comprising mixing the yttrium oxide and at least one titanium oxide, drying the mixture obtained and heat treating it wherein mixture is heated to a temperature between 1300°-1800° C. and, wherein said heat treatment is performed under an atmosphere containing at least 99% by volume of oxygen.

6. A process according to claim 5, wherein the mixture of yttrium oxide and titanium oxide is shaped prior to subjecting it to the head treatment.

7. Process according to claim 5, wherein the heat treatment is performed under isostatic pressure.

8. A process according to claim 5, wherein after the heat treatment the ceramic undergoes hot isostatic pressing at a temperature exceeding 1000° C.

9. A process according to claim 8, wherein said pressing is performed under an inert or oxidizing atmosphere.

10. A process according to claim 6, wherein the ceramic undergoes a subsequent heat treatment by heating at a temperature below the sintering temperature and above 1000° C. under an oxidizing atmosphere.

11. A process according to claim 10, wherein the subsequent heat treatment is performed at a temperature between 1000° and 1500° C.

12. The process of claim 10, wherein the subsequent heat treatment is performed at a temperature between 1100° and 1300° C.

13. The process of claim 5, wherein the heat treatment comprises raising the temperature of the mixture to 1500° and 1700° C.

14. The process of claim 5, wherein after the heat treatment, the ceramic undergoes hot isostatic pressing at a temperature between 1000° and 1700° C.

15. A process according to claim 8, wherein the ceramic undergoes a subsequent heat treatment by heating at a temperature below the sintering temperature and above 1000° C. under an oxidizing atmosphere.

* * * * *